(12) United States Patent
Koda

(10) Patent No.: US 12,105,882 B2
(45) Date of Patent: Oct. 1, 2024

(54) FORCE SENSE PRESENTATION DEVICE

(71) Applicant: Sony Interactive Entertainment Inc., Tokyo (JP)

(72) Inventor: Yuta Koda, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/264,078

(22) PCT Filed: Jul. 2, 2021

(86) PCT No.: PCT/JP2021/025125
§ 371 (c)(1),
(2) Date: Aug. 3, 2023

(87) PCT Pub. No.: WO2022/185560
PCT Pub. Date: Sep. 9, 2022

(65) Prior Publication Data
US 2024/0134455 A1    Apr. 25, 2024
US 2024/0231493 A9    Jul. 11, 2024

(30) Foreign Application Priority Data
Mar. 2, 2021    (JP) ................. 2021-032661

(51) Int. Cl.
*G06F 3/01*     (2006.01)
*G06F 3/0354*   (2013.01)

(52) U.S. Cl.
CPC .......... *G06F 3/016* (2013.01); *G06F 3/03545* (2013.01)

(58) Field of Classification Search
CPC ...... G06F 3/016; G06F 3/03545; G06F 3/011; G06F 3/0346
See application file for complete search history.

(56) References Cited

U.S. PATENT DOCUMENTS

2015/0035658 A1*  2/2015  Provancher ............ G05G 9/047
                                                   340/407.1

FOREIGN PATENT DOCUMENTS

| JP | 2000-200140 A | 7/2000 |
|---|---|---|
| JP | 2010-182315 A | 8/2010 |
| JP | 2010-287221 A | 12/2010 |
| JP | 2016-186696 A | 10/2016 |
| WO | 2019220803 A1 | 11/2019 |
| WO | 2019225170 A1 | 11/2019 |

* cited by examiner

*Primary Examiner* — Yaron Cohen
(74) *Attorney, Agent, or Firm* — XSENSUS LLP

(57) ABSTRACT

A force sense presentation device 1 includes a base body 2 that is gripped by a hand of a user, a movable unit 3 having a finger placement portion 5 on which the user is to place a fingertip in a state in which the base body 2 is gripped by the user, and a moving mechanism that moves the movable unit 3 with respect to the base body 2. The base body 2 is held by two or more fingers. The finger placement portion 5 has a finger engagement portion 4 provided thereon uprightly in a direction different from a moving direction of the movable unit 3.

18 Claims, 14 Drawing Sheets

FIG. 1
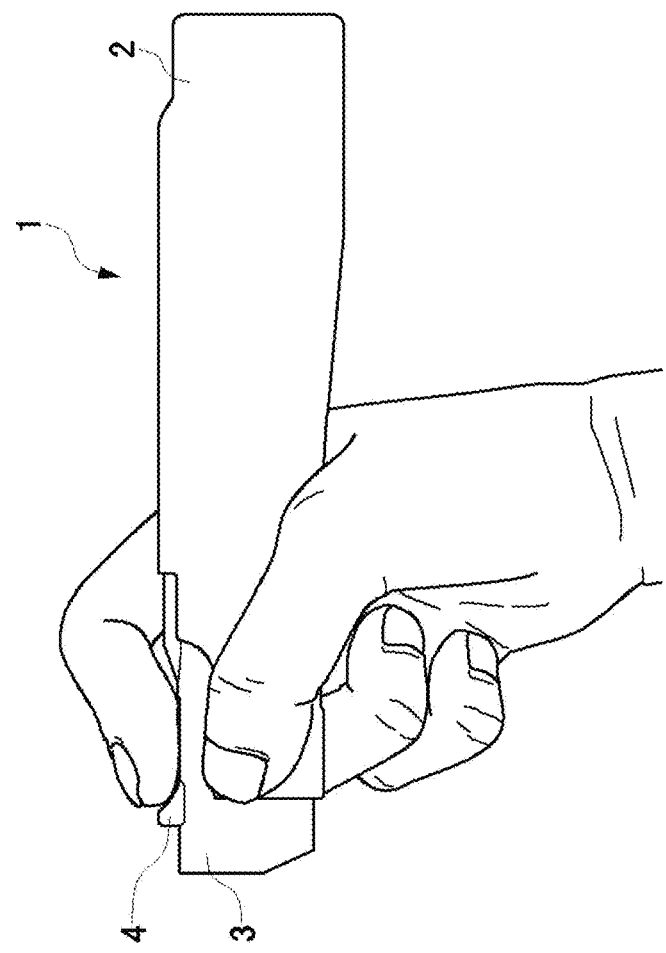
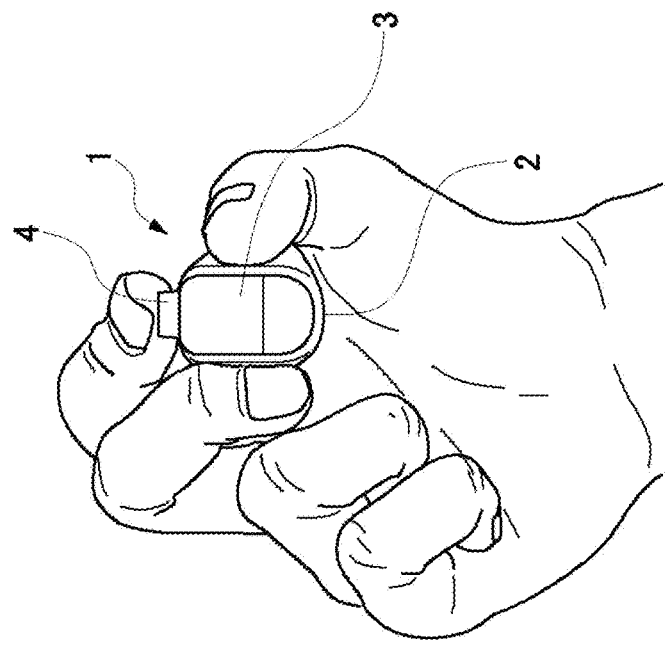

FIG.2
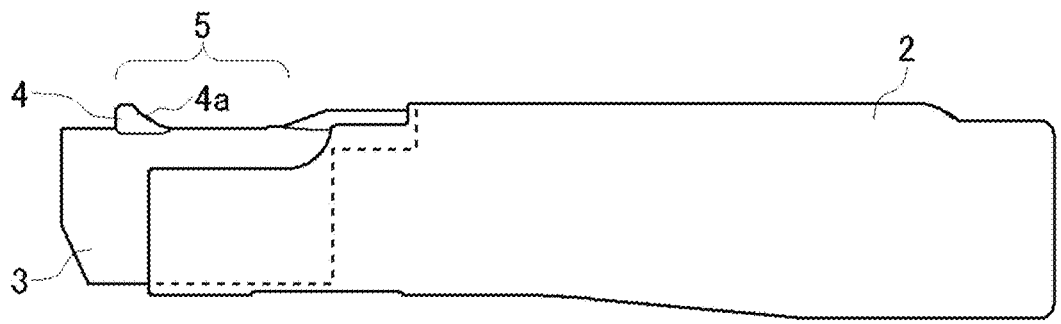
FIG.3
(a)
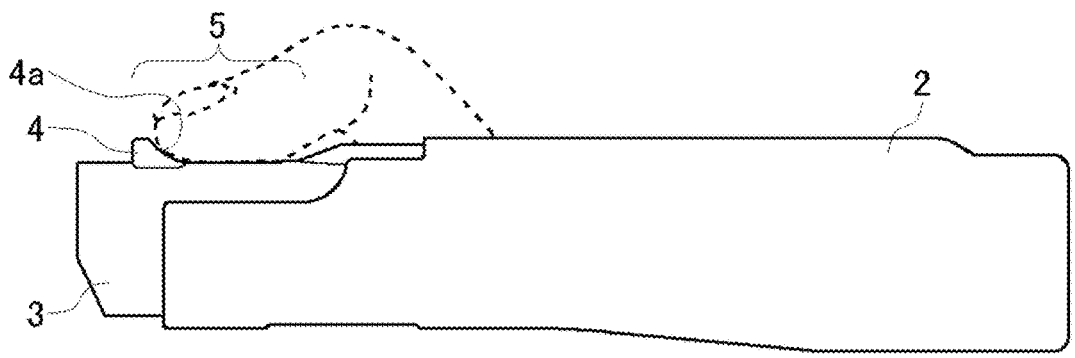
(b)
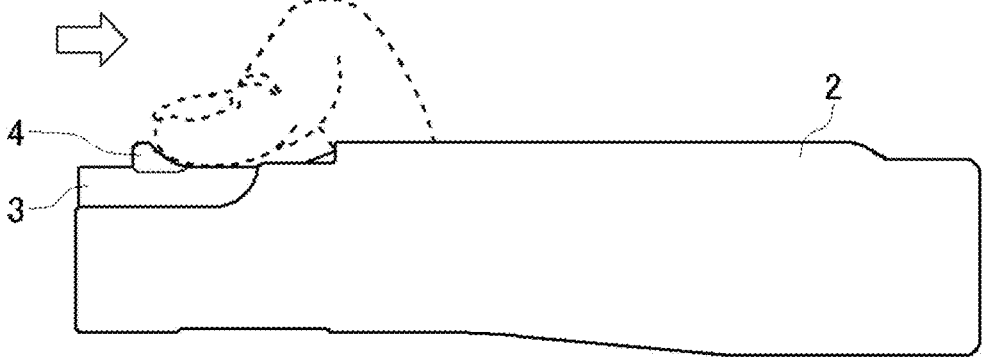

FIG.7
(a)
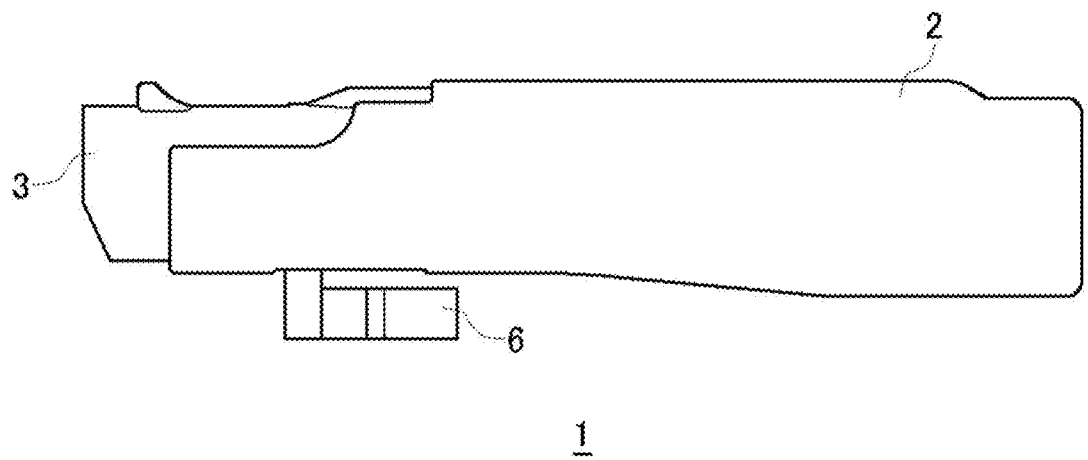
(b)
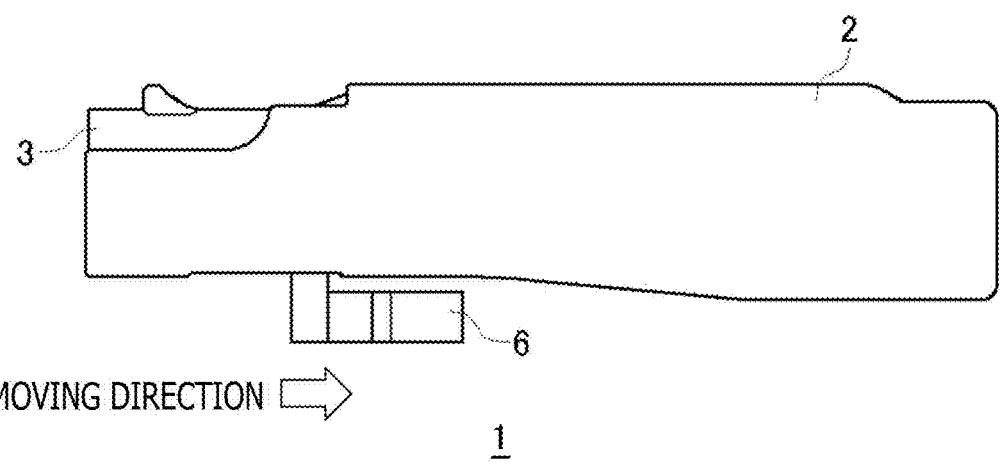

FORCE SENSE PRESENTATION DEVICE

CROSS-REFERENCE TO RELATED APPLICATIONS

The present application is based on PCT filing PCT/JP2021/025125, filed Jul. 2, 2021, which claims priority to JP 2021-032661, filed Mar. 2, 2021, the entire contents of which are incorporated herein by reference.

TECHNICAL FIELD

The present technology relates to a device that is gripped by a hand of a user and presents a force sense to the user.

BACKGROUND ART

PTL 1 discloses a force sense presentation device of a pen type in which, in a state in which a user inserts a forefinger in a ring fixed to a base and grips a movable unit with a thumb, the forefinger, and a middle finger, the movable unit moves relative to the base to present proprioceptive sensitivity to the three fingers of the user.

CITATION LIST

Patent Literature

[PTL 1]
Japanese Patent Laid-Open No. 2010-287221

SUMMARY

Technical Problem

In the force sense presentation device disclosed in PTL 1, if its user inserts the forefinger into the ring and fixes a hand to the base, then proprioceptive sensitivity is presented to the fingers with which the movable unit is gripped. Therefore, if the size of the forefinger of the user and the inner diameter of the ring do not match each other, then the hand cannot be fixed well to the base.

Therefore, it is an object of the present invention to provide a force sense presentation device that can be used easily by a user.

Solution to Problem

In order to solve the problem described above, a force sense presentation device of an embodiment of the present invention includes a base body that is gripped by a hand of a user, a movable unit having a finger placement portion on which the user is to place a fingertip in a state in which the base body is gripped by the user, and a moving mechanism that moves the movable unit with respect to the base body.

BRIEF DESCRIPTION OF DRAWINGS

FIG. 1 is a view depicting states in which a force sense presentation device is gripped by a user.

FIG. 2 is a side elevational view of the force sense presentation device.

FIG. 3 is a view depicting states in which a finger is placed on a movable unit.

FIG. 7 is a view depicting an example of a push-in member.

DESCRIPTION OF EMBODIMENTS

Embodiment 1

Figure 4:
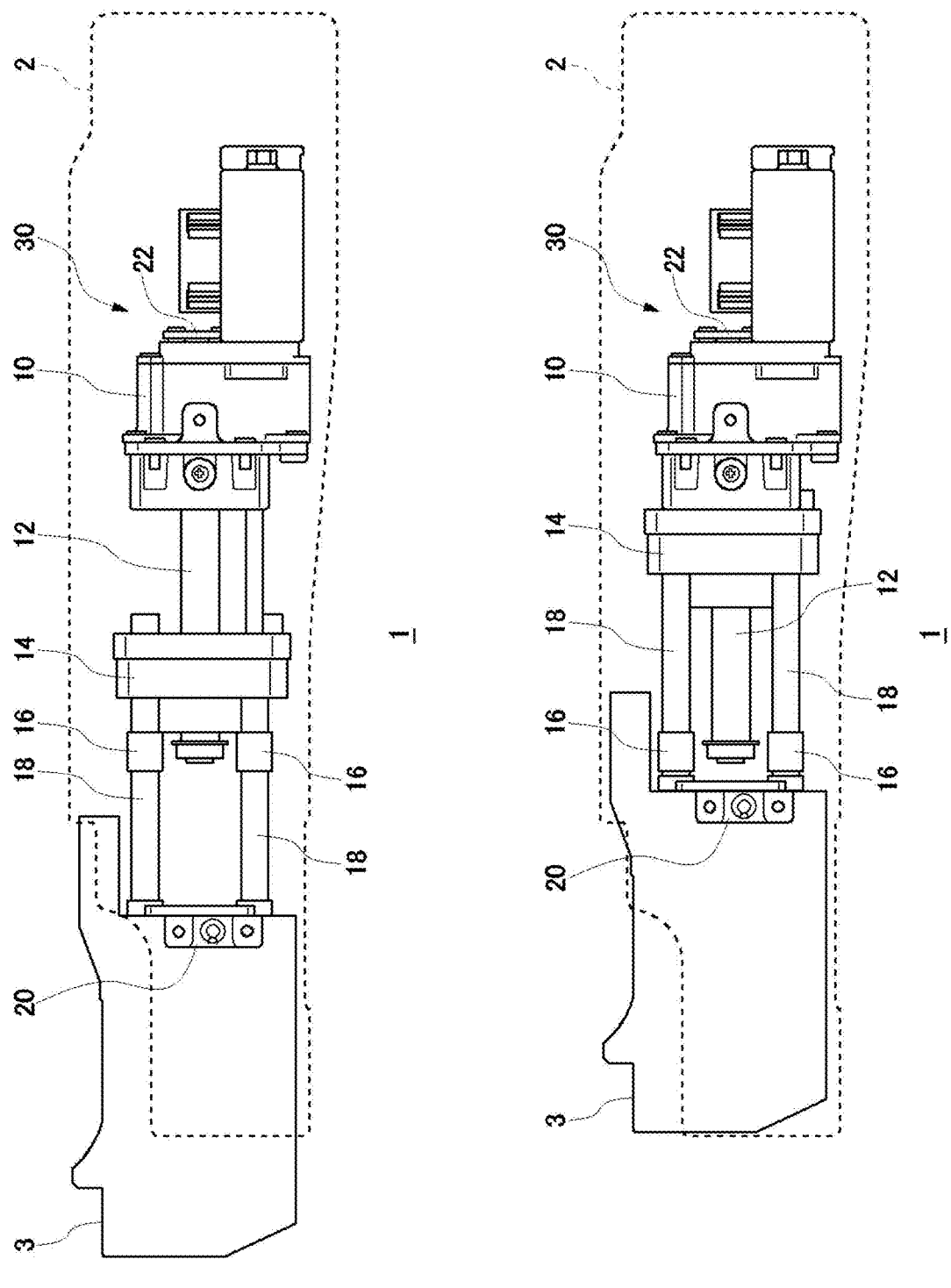
FIG. 4 is a view depicting a moving mechanism that moves the movable unit relative to a base body.

FIG. 1 depicts states in which a force sense presentation device 1 of an embodiment 1 is gripped by a user. FIG. 1(a) depicts a state in which the force sense presentation device 1 is viewed from the front, and FIG. 1(b) depicts a state in which the force sense presentation device 1 is viewed from a side. The force sense presentation device 1 includes a base body 2 that is gripped by a hand of the user and a movable unit 3 movable relative to the base body 2. The force sense presentation device 1 is a haptics device of a pen type, and the base body 2 has opposite side faces extending substantially in parallel to each other. The user uses the force sense presentation device 1 in a state in which the user holds the opposite side faces of the base body 2 with a thumb and a middle finger while a forefinger of the user is placed on the movable unit 3.

The force sense presentation device 1 is used, for example, as a virtual pen that puts out ink in a drawing application for drawing a picture or a character on a whiteboard placed in a virtual space. In this drawing application, a distal end portion of the force sense presentation device 1 corresponds to a pen tip of the virtual pen and, if the pen tip is brought into contact with a virtual object such as a whiteboard in the virtual space, then the movable unit 3 moves relative to the base body 2 to thereby present a force sense to the forefinger of the user. Since the force sense is presented, the user can recognize that the user may begin to draw a picture or a character.

FIG. 2 is a side elevational view of the force sense presentation device 1. In the force sense presentation device 1, a side on which the movable unit 3 is provided is defined as a distal end side, and a left side as viewed in side elevation depicted in FIG. 2 is referred to as a front side while a right side is referred to as a rear side. In the state depicted in FIG. 2, the movable unit 3 is positioned in such a manner as to most protrude forwardly from the base body 2, and this position of the movable unit 3 is made a "reference position" of the movable unit 3.

On a top face of the movable unit 3, a finger placement portion 5 on which a fingertip of the forefinger is to be placed in a state in which the base body 2 is gripped by the user is provided. At the front end of the finger placement portion 5, a finger engagement portion 4 with which a tip end portion of the finger is to engage is provided. The finger engagement portion 4 is provided uprightly in a direction different from a moving direction of the movable unit 3 (that is, in a forward-rearward direction), and in the embodiment 1, the finger engagement portion 4 is provided uprightly in a direction perpendicular to the top face of the movable unit 3. The finger engagement portion 4 has a curved face 4*a* that is inclined in such a manner as to extend along the body of the finger and that has a curvature. Since the curved face 4*a* is inclined with respect to the top face of the movable unit 3 and is formed in a recessed shape in a direction in which the curved face 4*a* is contacted by a fingertip, the user can contact a tip end portion of the forefinger with the curved face 4*a* stably.

The user holds the opposite side faces of the base body 2 with the thumb and the middle finger in such a manner as to hold a pen and places the body of the forefinger on the finger placement portion 5. Consequently, the user can place the forefinger on the finger placement portion 5 irrespective of his/her dominant hand. It is to be noted that the user may hold the base body 2 with his/her three or more fingers and place, on the finger placement portion 5, the body of any other finger that does not mainly participate in the holding of the base body 2. When the base body 2 of the force sense presentation device 1 is gripped with two or more fingers in such a manner, the base body 2 can be fixed to the hand without the necessity for a special gripping mechanism for fixing the base body 2 to the hand.

FIG. 3(*a*) depicts a state in which a finger is placed on the movable unit 3 that is at the reference position. If the user places the body of a finger on the finger placement portion 5, then a tip end portion of the finger fits and touches with the curved face 4*a*. Since the tip end portion of the finger abuts with the finger engagement portion 4 in such a manner, when the movable unit 3 moves in a direction in which the movable unit 3 is pulled in to the base body 2, the finger moves with the finger engagement portion 4 with certainty.

FIG. 3(*b*) depicts a state in which the movable unit 3 moves in the direction in which the movable unit 3 is pulled in to the base body 2. When the movable unit 3 moves, the fingertip portion moves in such a manner as to interlock with the movable unit 3 by the frictional force that acts between the fingertip portion and the finger placement portion 5, and since the fingertip portion is in contact with the finger engagement portion 4 that is provided uprightly in a perpendicular direction with respect to the moving direction, the fingertip portion moves in an interlocking relation with the movement of the movable unit 3 with certainty.

FIG. 4 depicts a moving mechanism 30 that moves the movable unit 3 relative to the base body 2. FIG. 4(*a*) depicts a state of the moving mechanism 30 when the movable unit 3 is at the reference position, and FIG. 4(*b*) depicts a state of the moving mechanism 30 when the movable unit 3 is pulled in from the reference position.

The moving mechanism 30 includes a rotary actuator 10, a feed screw 12, a nut 14, guide mechanisms 16, rods 18, a fixation portion 20, and a rotation angle sensor 22 and slidably moves the movable unit 3 in a longitudinal direction of the base body 2. In the present moving mechanism 30, the rotary actuator 10 rotates the feed screw 12 forwardly or reversely to move the nut 14 in an axial direction of the feed screw 12 (in the longitudinal direction of the base body 2). A plurality of rods 18 are fixed to the nut 14, and the fixation portion 20 that is to be fixed to a fixation target portion of the movable unit 3 is attached to a tip end portion of the rods 18. The rods 18 are guided in movement in an advancing direction by the guide mechanisms 16 fixed to the inner wall of the base body 2. The rotation angle sensor 22 detects a rotation angle of the rotary actuator 10, and the movement of the movable unit 3 is controlled on the basis of a detection value of the rotation angle sensor 22.

Figure 5:
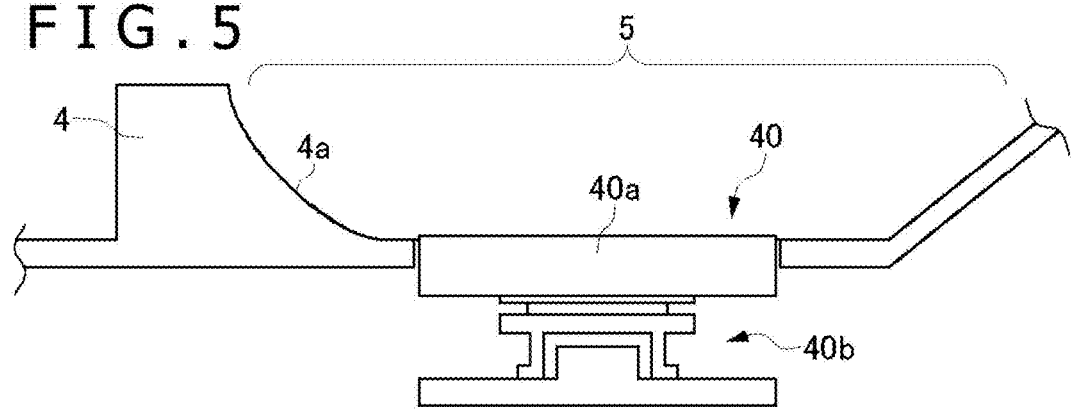
FIG. 5 is a view depicting an example of a switch mechanism.

FIG. 5 depicts an example of a switch mechanism 40 whose operation inputting is performed by the user. The force sense presentation device 1 of the embodiment 1 includes the switch mechanism 40 that can be operated by the fingertip placed on the finger placement portion 5. The switch mechanism 40 may be configured as a tactile switch having a contact structure 40*b*, and the user turns on the switch by pushing in an operation button 40*a* of a push type. It is to be noted that the switch mechanism 40 may have a structure of a different type.

The operation button 40*a* that is operated by the user is provided on a rear side of the finger placement portion 5 with respect to the curved face 4*a*. In a drawing application for drawing a picture or a character on a whiteboard installed in a virtual space, the operation button 40*a* may be used as an operation member for putting out ink.

Since the operation button 40*a* is provided on the finger placement portion 5, the user can operate the operation button 40*a* freely with the forefinger in a state in which the user holds the base body 2 with the thumb and the middle finger. The switch mechanism 40 has a spring member that biases the operation button 40*a* in an upward direction and is configured such that, if the forefinger is simply placed on the operation button 40*a*, the contact structure 40*b* is not placed into an on-state. Since the tip end portion of the forefinger does not mainly participate in holding of the force sense presentation device 1, the user can push in the forefinger placed on the finger placement portion 5, at a desired timing to render the switch mechanism 40 operative.

Figure 6:
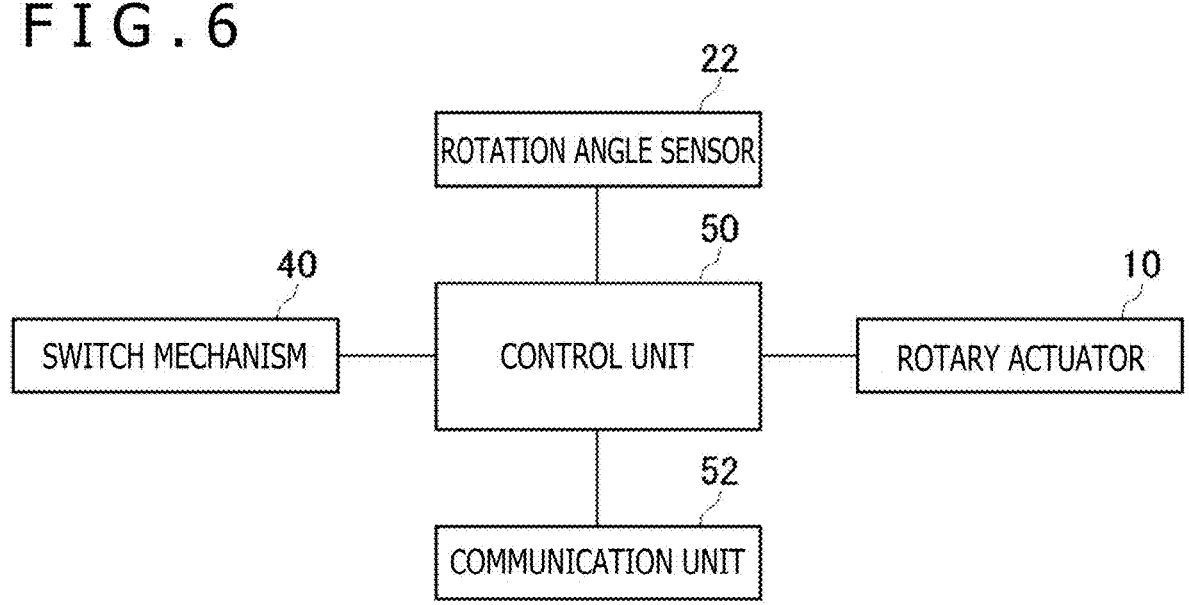
FIG. 6 is a view depicting functional blocks of the force sense presentation device.

FIG. 6 depicts functional blocks of the force sense presentation device 1. A control unit 50 controls action of the force sense presentation device 1. A communication unit 52 performs transmission and reception of data to and from a processing device, which executes the drawing application, and the force sense presentation device 1. If the user brings the pen tip of the virtual pen into contact with the whiteboard in the virtual space, then the drawing application provides, to the force sense presentation device 1, reaction force data used for generating reaction force by the contact. It is to be noted that position coordinates of the force sense presentation device 1 in a real space may be tracked with use of an external camera, or may estimate the position of the force sense presentation device 1 itself with use of a built-in IMU (Inertial Measurement Unit) or camera. If the communication unit 52 receives reaction force data, then the control unit 50 controls, while monitoring the detection value of the rotation angle sensor 22, the rotary actuator 10 to move the movable unit 3 located at the reference position, in a direction in which the movable unit 3 is pulled in to the base body 2. Consequently, the forefinger of the user is acted upon by push-in force from the finger engagement portion 4, and the user recognizes that the pen tip comes into contact with the whiteboard.

If the user operates the operation button 40*a* in this state to render the switch mechanism 40 operative, then the communication unit 52 transmits data indicative of switch-on to the processing device. Consequently, it becomes possible for the user to draw a picture or a character on the whiteboard by using the virtual pen. When the force sense presentation device 1 of the embodiment 1 is used in such a manner, the user can enjoy the drawing application while feeling the force acting upon the pen tip.

FIG. 7 depicts an example of a push-in member 6 provided on the movable unit 3. The push-in member 6 is a member for presenting a force sense to a palm of a hand and is formed on a lower face of the movable unit 3. The push-in member 6 may be configured as a bar-like member that is pushed in to a palm of a hand of the user when the movable unit 3 moves. FIG. 7(a) depicts the movable unit 3 located at the reference position, and FIG. 7(b) depicts the movable unit 3 when the movable unit 3 moves in the direction in which the movable unit 3 is pulled in to the base body 2.

Figure 8:
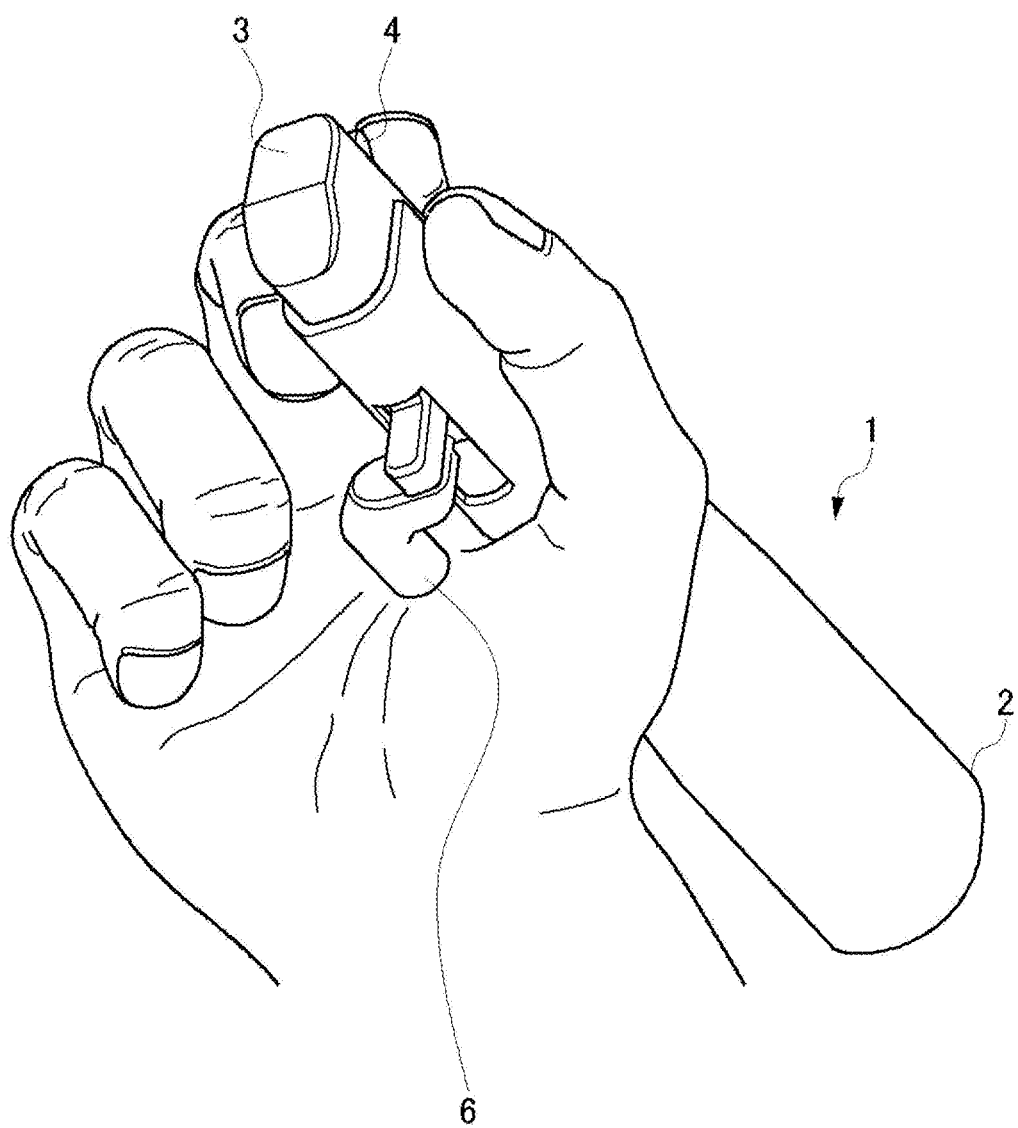
FIG. 8 is a view depicting a state in which the force sense presentation device is gripped by the user.

FIG. 8 depicts a state in which the force sense presentation device 1 is gripped by the user. In the present example, the movable unit 3 is at the reference position and most protrudes forwardly from the base body 2. If the movable unit 3 is moved from this state in the direction in which the moving mechanism 30 pulls in the movable unit 3, then a distal end portion of the push-in member 6 pushes the palm of the hand of the user. In such a manner, since the force sense presentation device 1 presents a force sense by using not only the finger engagement portion 4 but also the push-in member 6, the user can more clearly feel the reaction force acting upon the user from a virtual object.

Embodiment 2

In the embodiment 1, the moving mechanism 30 moves the movable unit 3 in the longitudinal direction of the base body 2 to present reaction force when a pen tip of a virtual pen comes into contact with a virtual object (whiteboard) in a virtual space. In an embodiment 2, in order to present frictional force when a pen tip of a virtual pen moves on a virtual object, the moving mechanism has a function for rotating the movable unit around an axial line parallel to the longitudinal direction of the base body.

Figure 9:
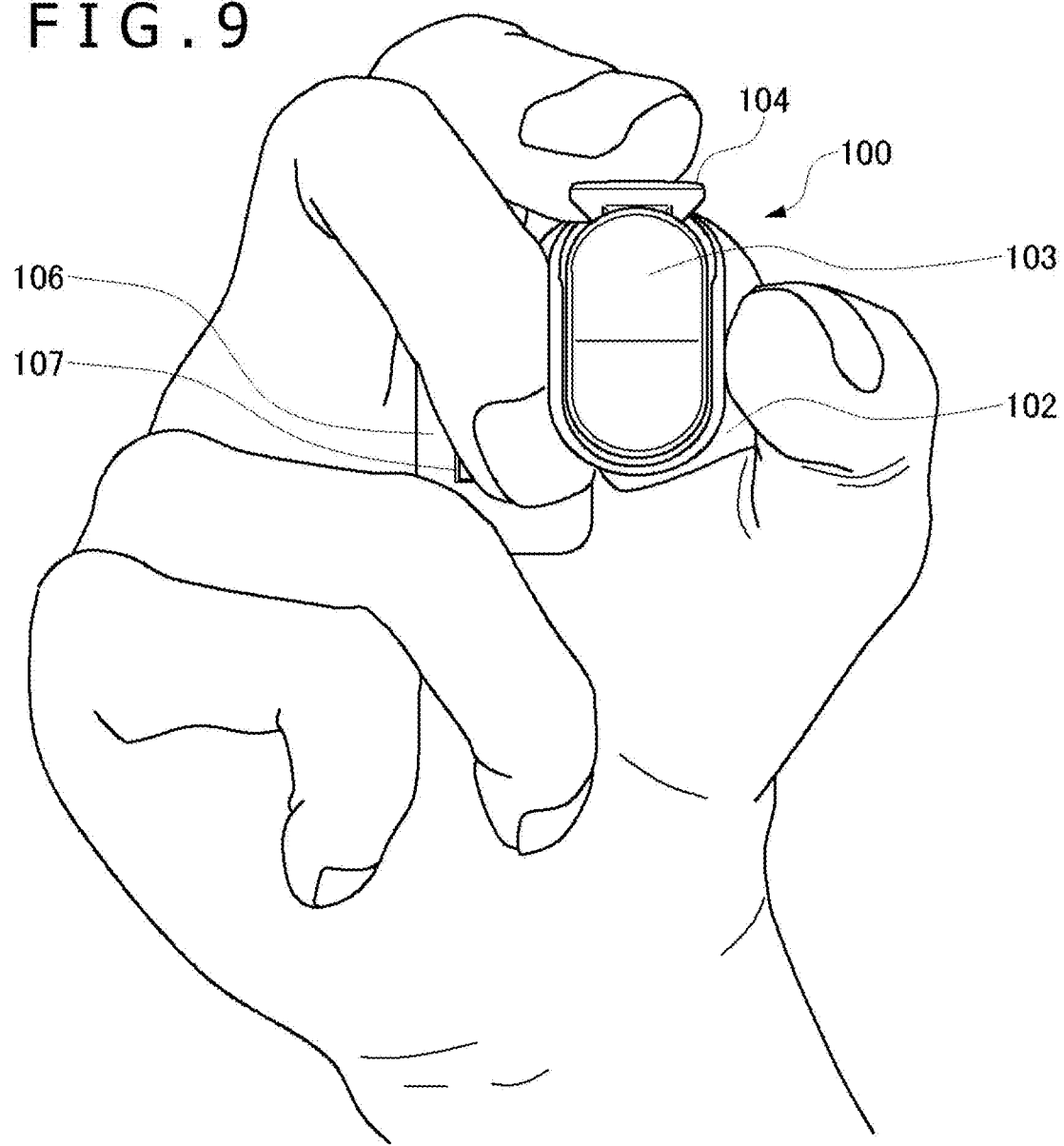
FIG. 9 is a view depicting a state in which another force sense presentation device is gripped by a user.

FIG. 9 depicts a state in which a force sense presentation device 100 of the embodiment 2 is gripped by a user. The force sense presentation device 100 includes a base body 102 that is gripped by a hand of a user and a movable unit 103 that is movable relative to the base body 102. The force sense presentation device 100 is a haptics device of the pen type, and the base body 102 has opposite side faces extending substantially in parallel to each other. The user uses the force sense presentation device 100 in a state in which the user holds the opposite side faces of the base body 102 with a thumb and a middle finger and a forefinger is placed on the movable unit 103. The movable unit 103 in the embodiment 2 is movable in a longitudinal direction of the base body 102 relative to the base body 102 and besides is rotatable around an axial line parallel to the longitudinal direction of the base body 102 relative to the base body 102.

A switch installation member 106 on which a switch mechanism 107 is disposed is provided on a side face of the base body 102, and the user contacts his/her middle finger with a surface of the switch installation member 106. The switch mechanism 107 has an operation button of the push type and may have a structure same as that of the switch mechanism 40 of the embodiment 1. The user can turn on the switch by pushing in the operation button with the middle finger.

The force sense presentation device 100 of the embodiment 2 may be used as a virtual pen for putting out ink in a drawing application for drawing a picture or a character on a whiteboard provided in a virtual space, similarly to the force sense presentation device 1 of the embodiment 1. In the drawing application, the movable unit 103 slidably moves relative to the base body 102 to present, to the forefinger, a force sense in a push-in direction of the pen tip, and the movable unit 103 rotationally moves relative to the base body 102 to present, to the forefinger, a force sense in a direction reverse to a direction in which the pen tip moves on the whiteboard (the force sense corresponds to frictional force acting upon the pen tip). Since the force sense is presented, the user can physically feel that he/she is moving the virtual pen to draw a picture of a character.

Figure 10:
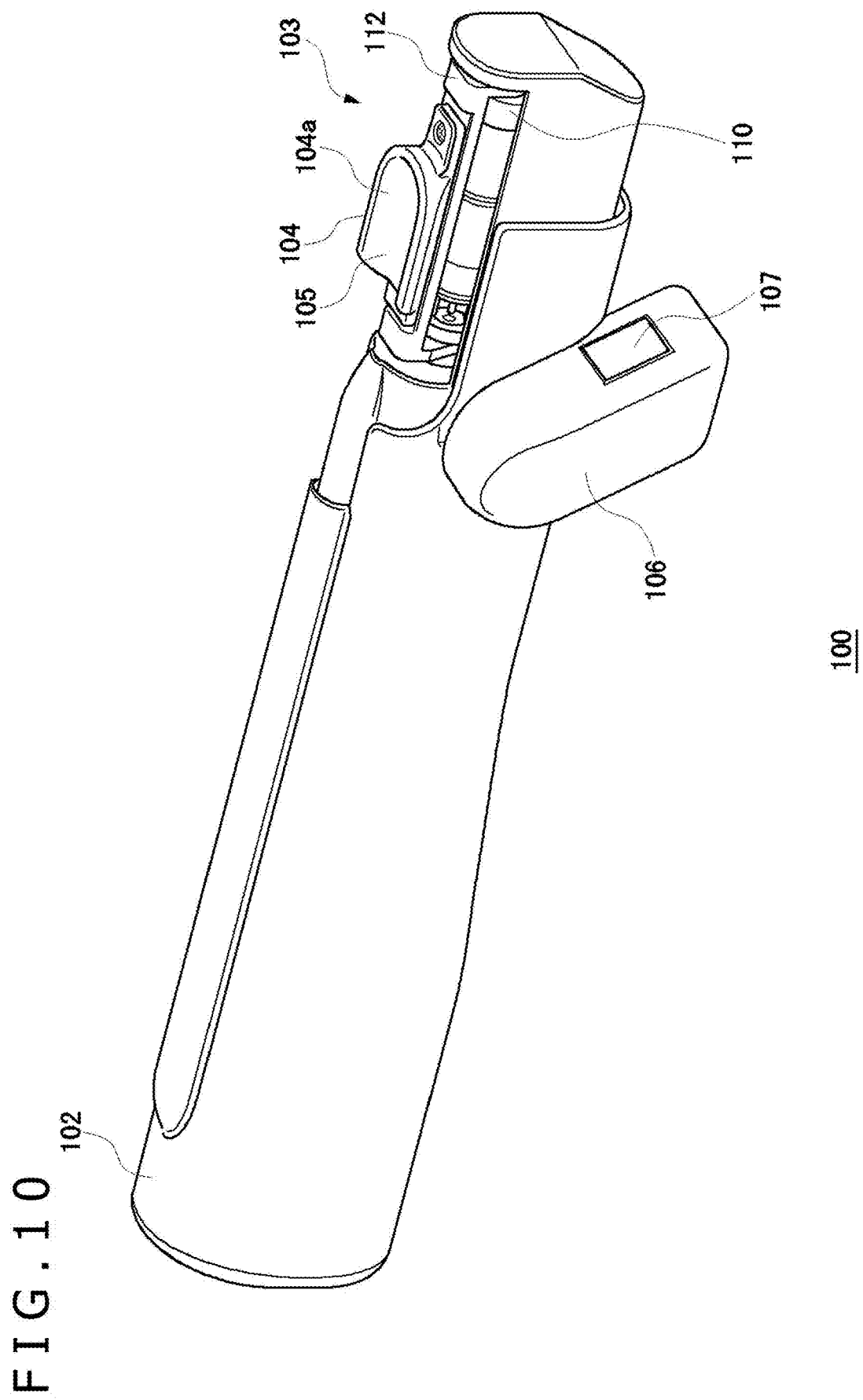
FIG. 10 is a side elevational view of the force sense presentation device.

FIG. 10 is a perspective view of the force sense presentation device 100. In the force sense presentation device 100, a side on which the movable unit 103 is provided is defined as a distal end side. In a state depicted in FIG. 10, the movable unit 103 is at a position at which the movable unit 103 most protrudes forwardly from the base body 102, and this position is a "reference position" of the movable unit 103. Further, in the state depicted in FIG. 10, a rotation angle of the movable unit 103 is zero, and this posture is a "reference posture" of the movable unit 103.

On a top face of the movable unit 103, a finger placement portion 105 on which a fingertip of the forefinger is to be placed in a state in which the user grips the base body 102 is provided. At opposite side portions and a front end portion of the finger placement portion 105, a finger engagement portion 104 with which a tip end portion of the finger is to engage is provided. The finger engagement portion 104 is formed in a direction different from two moving directions of the movable unit 103, that is, from the longitudinal direction of the base body 102 and a rotation direction around an axial line parallel to the longitudinal direction. In particular, the finger engagement portion 104 is provided uprightly on an upper face of a beam member of a support base frame 112 hereinafter described. The finger engagement portion 104 has a curved face 104a that is inclined in such a manner as to extend along the body of the finger and that has a curvature. Since the curved face 104a is inclined with respect to the top face of the beam member and is formed in a recessed shape in a direction in which the curved face 104a is contacted by a fingertip, the user can contact a tip end portion of the forefinger with the curved face 104a stably.

The user holds the opposite side faces of the base body 102 with the thumb and the middle finger in such a manner as to hold a pen and places the body of the forefinger on the finger placement portion 105 while the body of the middle finger is placed on the surface of the switch installation member 106. It is to be noted that the user may otherwise hold the base body 102 with his/her three or more fingers and place, on the finger placement portion 105, the body of any other finger that does not mainly participate in the holding of the base body 102. When the base body 102 of the force sense presentation device 100 is gripped with two or more fingers in such a manner, the base body 102 can be fixed to the hand without the necessity for a special gripping mechanism for fixing the base body 102 to the hand.

Figure 11:
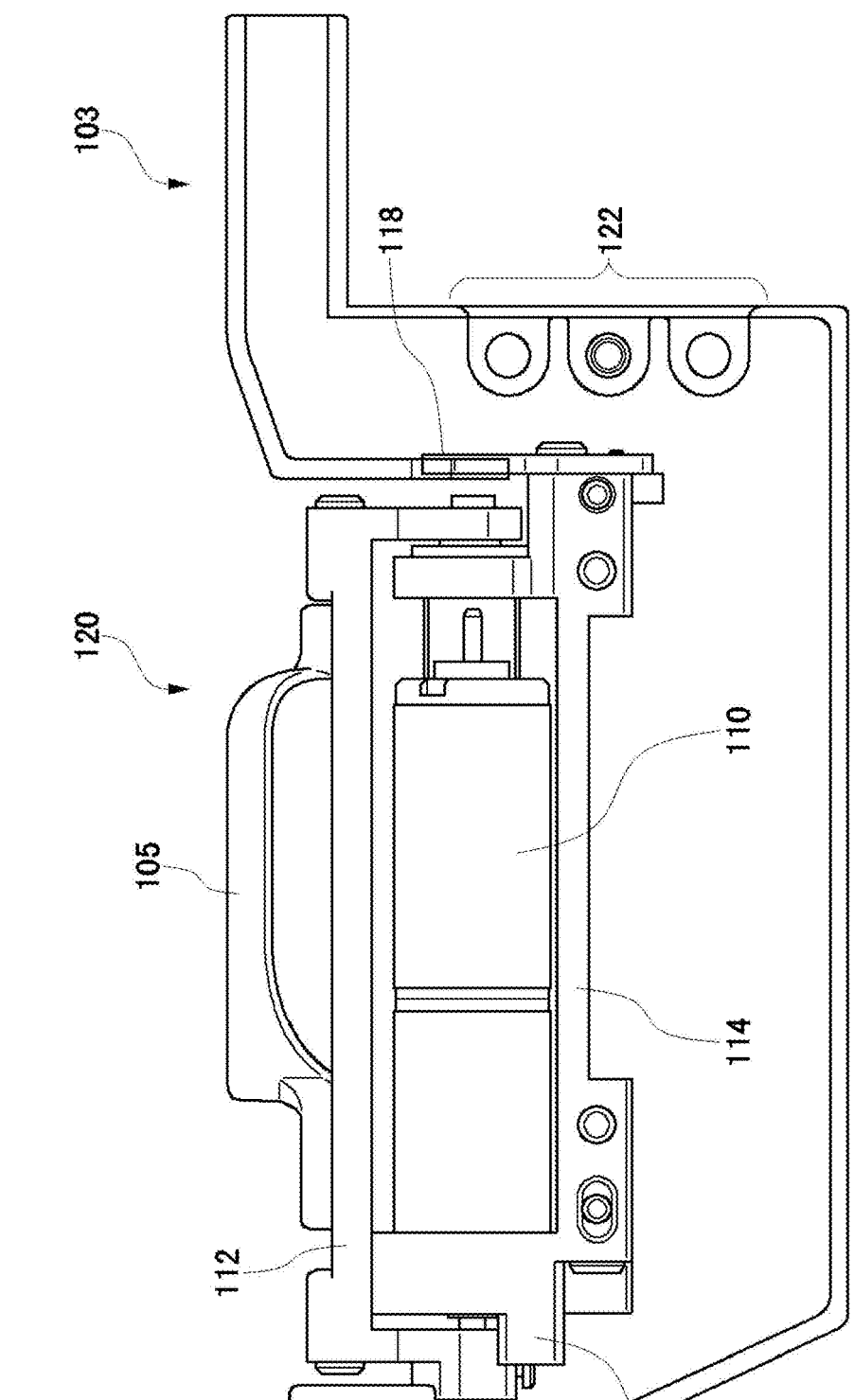
FIG. 11 is a view depicting a moving mechanism that rotationally moves a movable unit relative to a base body.

FIG. 11 depicts a moving mechanism 120 that rotationally moves the movable unit 103 relative to the base body 102. The moving mechanism 120 includes a rotary actuator 110, a support base frame 112, a base portion 114, stoppers 116, and a rotation angle sensor 118 and rotationally moves the movable unit 103 around an axial line. It is to be noted that the fixation portion 20 depicted in FIG. 4 is fixed to a fixation target portion 122 of the movable unit 103 such that the movable unit 103 can slidably be moved by the moving mechanism 30.

The base portion 114 is fixed to a housing of the movable unit 103 and supports the support base frame 112, on which the finger placement portion 105 is provided, for rotation thereon. The support base frame 112 has a gate-shaped structure including a pair of pillar members and a beam member that connects the pair of pillar members to each other. The pair of pillar members are connected for rotation to the base portion 114, and the beam member has the finger placement portion 105 mounted on the upper face thereof. The rotary actuator 110 is fixed to the base portion 114, and a motor shaft thereof is connected to one of pillar portions of the support base frame 112. In the moving mechanism 120, if the rotary actuator 110 rotates forwardly or reversely, then the support base frame 112 rotates clockwise or counterclockwise when the force sense presentation device 100 is viewed from the front. The base portion 114 has a pair of stoppers 116 formed thereon, and the stoppers 116 restrict rotation of the support base frame 112. The rotation angle sensor 118 detects a rotation angle of the rotary actuator 110, and rotation of the movable unit 103 is controlled on the basis of a detection value of the rotation angle sensor 118.

Figure 12:
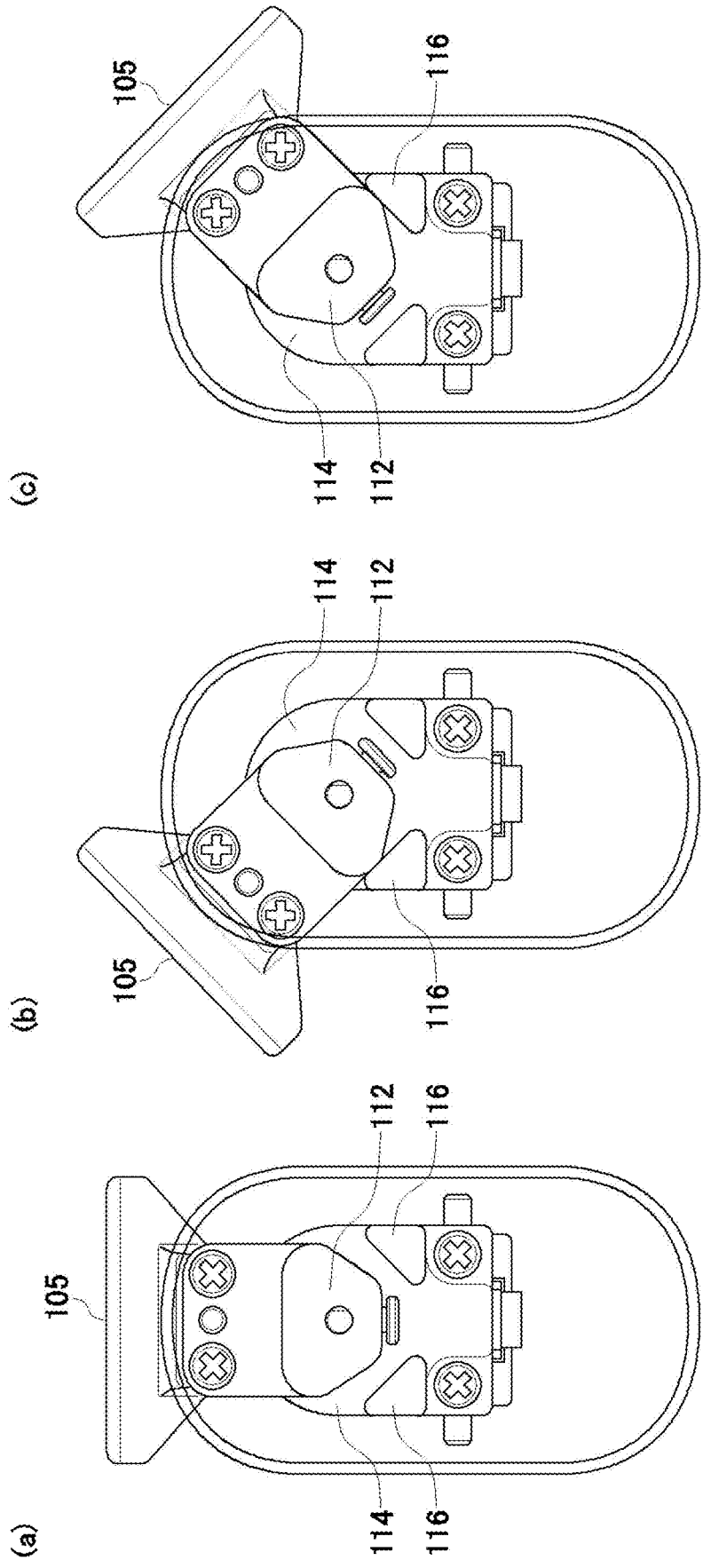
FIG. 12 is a view depicting tilting of a support base frame when the force sense presentation device is viewed from the front.

FIG. 12 depicts tilting of the support base frame 112 when the force sense presentation device 100 is viewed from the front.

FIG. 12(a) depicts the base portion 114 in the reference posture and the support base frame 112. In the reference posture, the rotational angle is zero degree.

FIG. 12(b) depicts a state in which the support base frame 112 rotates counterclockwise with respect to the base portion 114. The support base frame 112 is restricted against rotation by a corresponding one of the stoppers 116, and the maximum rotational angle at the time of counterclockwise rotation may be −45 degrees. FIG. 12(c) depicts a state in which the support base frame 112 rotates clockwise with respect to the base portion 114. The support base frame 112 is restricted against rotation by a corresponding one of the stoppers 116, and the maximum rotational angle at the time of clockwise rotation may be +45 degrees.

Figure 13:
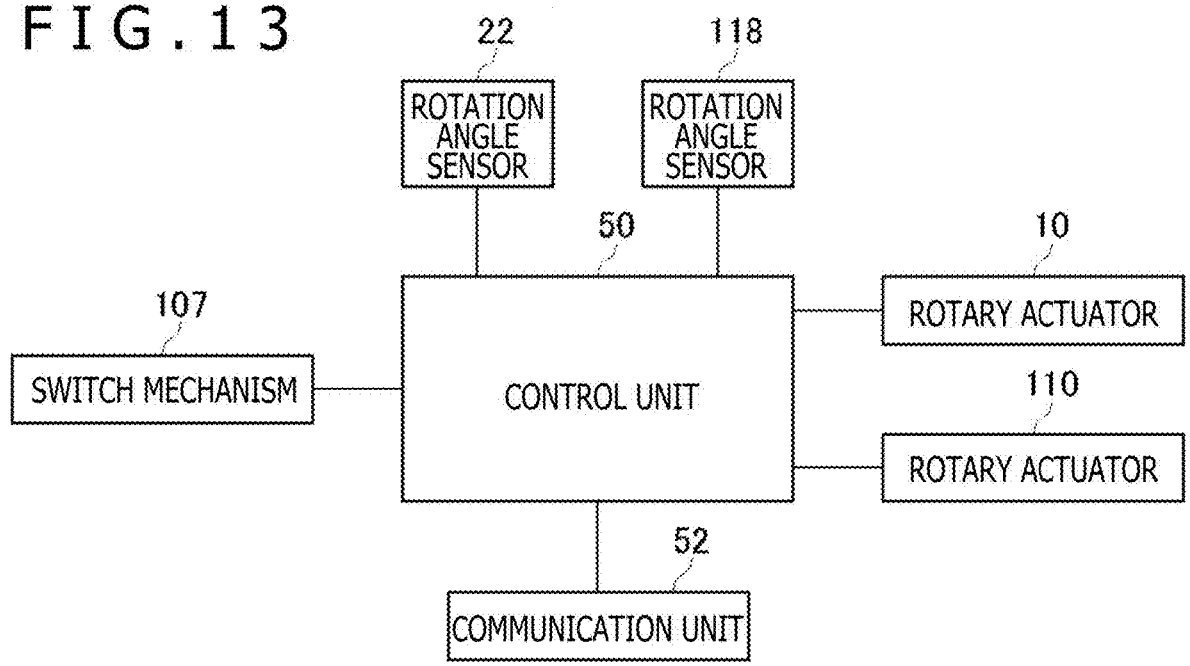
FIG. 13 is a view depicting functional blocks of the force sense presentation device.

FIG. 13 depicts functional blocks of the force sense presentation device 100. A control unit 50 controls action of the force sense presentation device 100. The communication unit 52 performs transmission and reception of data to and from a processing device, which executes a drawing application, and the force sense presentation device 100. If the user brings a pen tip of a virtual pen into contact with a whiteboard in a virtual space and moves the pen tip on the whiteboard, then the drawing application provides, to the force sense presentation device 100, reaction force data for generating reaction force by the pen action. If the communication unit 52 receives reaction force data, then the control unit 50 controls, while monitoring the detection value of the rotation angle sensor 22, the rotary actuator 10 to move the movable unit 103 located at the reference position, in a direction in which the movable unit 103 is pulled in to the base body 102, and/or controls, while monitoring the detection value of the rotation angle sensor 118, the rotary actuator 110 to rotate the support base frame 112 in the reference posture. Consequently, the forefinger of the user is acted upon by push-in force and/or rotation force from the finger engagement portion 4, and the user physically feels that he/she is moving the pen on the whiteboard.

If the user renders the switch mechanism 107 operative in this state, then the communication unit 52 transmits data indicative of switch-on to the processing device. Consequently, it becomes possible for the user to draw a picture or a character on the whiteboard by using the virtual pen. When the force sense presentation device 100 of the embodiment 2 is used in such a manner, the user can enjoy the drawing application while feeling the force acting upon the pen tip.

The present invention has been described in connection with the plurality of embodiments. The above-described embodiments are exemplary, and it can be recognized by those skilled in the art that various modifications can be made in combinations of the components and the processes of the embodiments and that such modifications also fall within the scope of the present invention.

For example, a vibrator may be provided on the base body 2, 102 held by the user. This makes it possible for the force sense presentation device 1, 100 to present tactile stimulation by vibration to the user. It is to be noted that, when a force sense is to be presented, the force sense presentation device 1, 100 may output sound indicative of contact sound from a built-in speaker.

Although, in the embodiment 1, the moving mechanism 30 moves the movable unit 3 in the forward-rearward direction by using the feed screw 12, in a modification, the moving mechanism 30 may move the movable unit 3 in the forward-rearward direction by using a wire linear motion mechanism.

Figure 14:
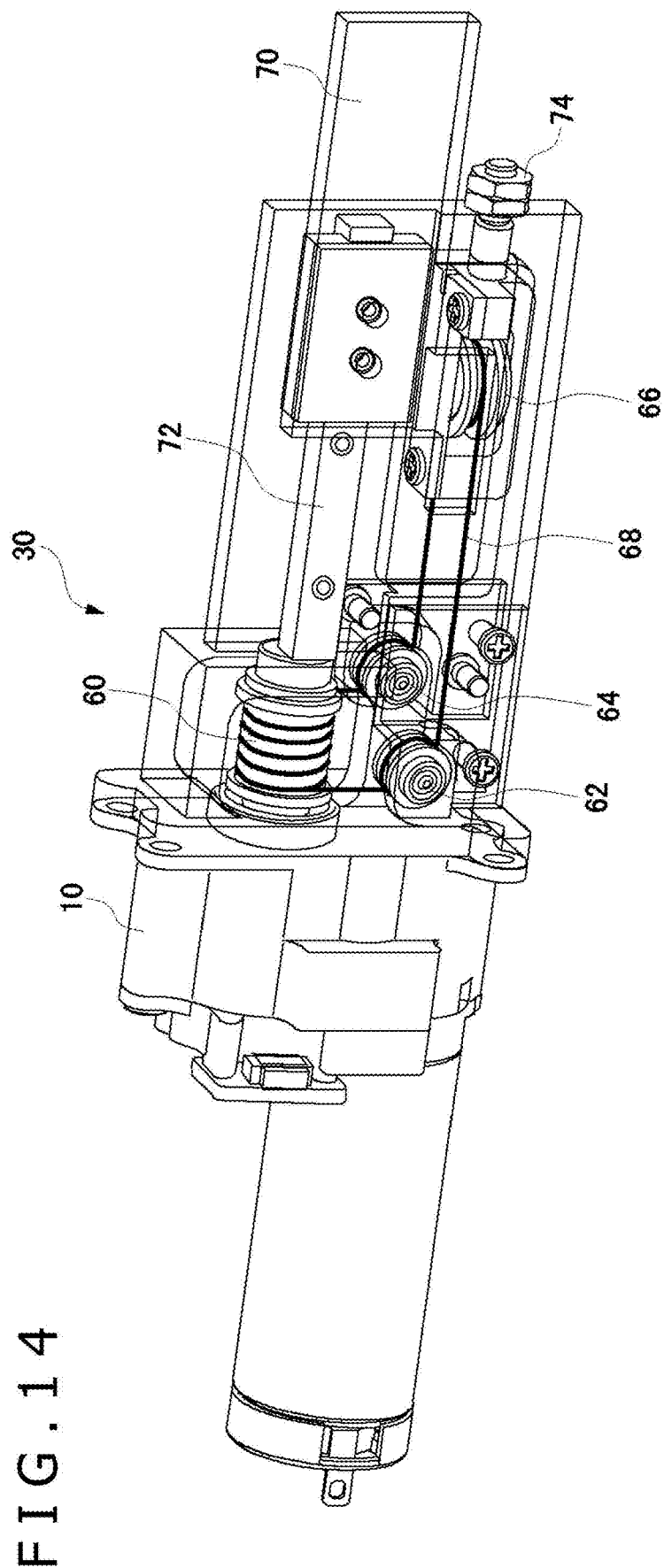
FIG. 14 is a view depicting a modification of the moving mechanism.
Figure 15:
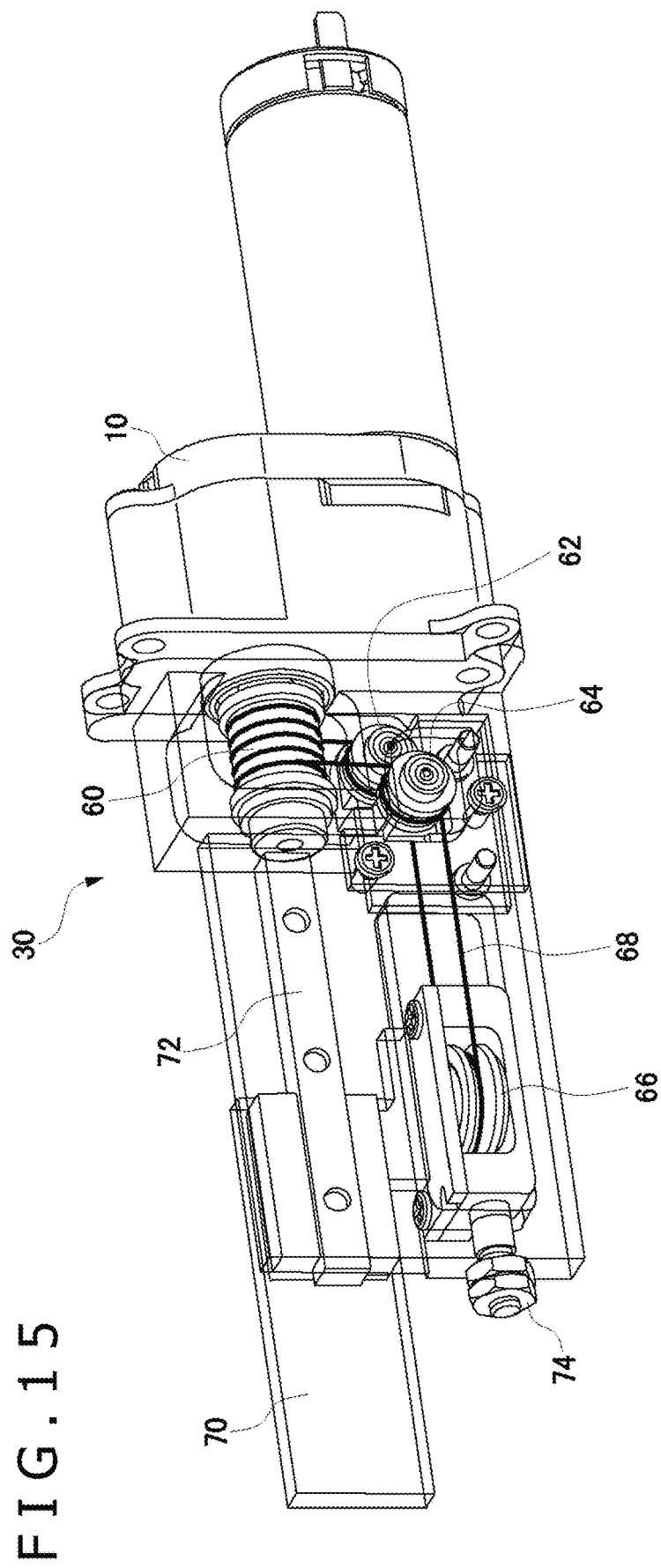
FIG. 15 is a view depicting the modification of the moving mechanism.
Figure 16:
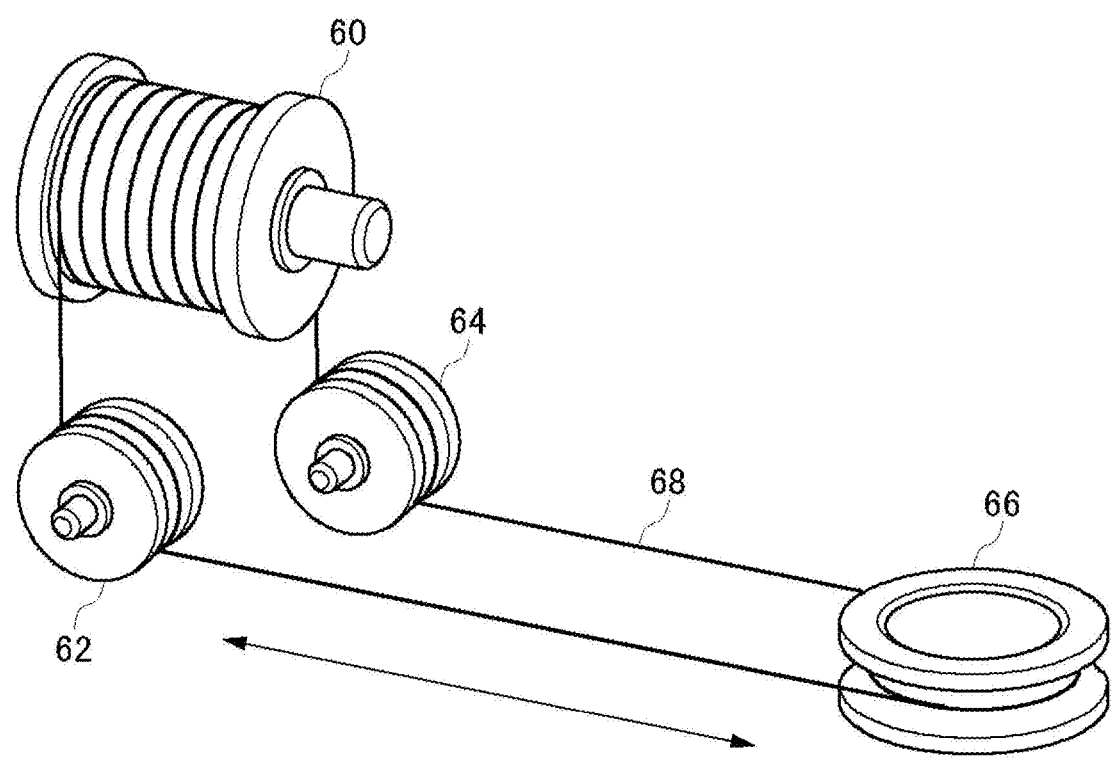
FIG. 16 is a view depicting a wire linear motion mechanism.

FIGS. 14 and 15 depict a modification of the moving mechanism 30. The moving mechanism 30 includes a reel 60, a first pulley 62, a second pulley 64, a third pulley 66, a fixation member 70, and a linear slider 72. FIG. 16 depicts the wire linear motion mechanism extracted from the moving mechanism 30. A wire 68 is wrapped around the reel 60, the first pulley 62, the second pulley 64, and the third pulley 66 that configure the wire linear motion mechanism, and rotation of the reel 60 moves the wire 68. The user can adjust the wire tension such that the wire 68 does not become loose, by operating a tension adjustment screw 74 to move the position of the third pulley 66.

A fixation portion (not depicted) fixed to a fixation target portion of the movable unit 3 is provided at a distal end portion of the fixation member 70. The fixation member 70 is fixed to the wire 68, and the linear slider 72 restricts a moving direction of the fixation member 70 to the forward-rearward direction. In the moving mechanism 30 of the modification, when the rotary actuator 10 rotates the reel 60 forwardly or reversely, the reel 60 moves the wire 68 in the forward-rearward direction, and accordingly, movement of the movable unit 3 fixed to the fixation member 70 in the forward-rearward direction is implemented. Since the wire linear motion mechanism in the modification is less likely to be influenced by the frictional resistance, it is possible to present an accurate force sense with a less hysteresis.

INDUSTRIAL APPLICABILITY

The present invention can be used in a device that is gripped by a hand of a user to present a force sense to the user.

REFERENCE SIGNS LIST

1: Force sense presentation device
2: Base body
3: Movable unit
4: Finger engagement portion
4a: Curved face
5: Finger placement portion
6: Push-in member
10: Rotary actuator
12: Feed screw
14: Nut 16: Guide mechanism
18: Rod
20: Fixation portion
22: Rotation angle sensor
30: Moving mechanism
40: Switch mechanism
40a: Operation button
40b: Contact structure
50: Control unit
52: Communication unit
60: Reel
62: First pulley
64: Second pulley
66: Third pulley
68: Wire
70: Fixation member
72: Linear slider
74: Tension adjustment screw
100: Force sense presentation device
102: Base body
103: Movable unit
104: Finger engagement portion
104a: Curved face
105: Finger placement portion
106: Switch installation member
107: Switch mechanism
110: Rotary actuator
112: Support base frame
114: Base portion
116: Stopper
118: Rotation angle sensor
120: Moving mechanism
122: Fixation target portion

The invention claimed is:

1. A force sense presentation device comprising:
a base body that is gripped by a hand of a user;
a movable unit having a finger placement portion on which the user is to place a fingertip in a state in which the base body is gripped by the user; and
a moving mechanism that moves the movable unit with respect to the base body,
wherein the moving mechanism is configured to move the movable unit in and out of the base body, and
wherein the moving mechanism includes:
a rotary actuator;
a feed screw;
a nut;
a plurality of rods;
a fixation portion; and
a rotation angle sensor configured to detect a rotation angle of the rotary actuator.

2. The force sense presentation device according to claim 1, wherein
the base body is held by two or more fingers.

3. The force sense presentation device according to claim 1, wherein
the finger placement portion has a finger engagement portion provided thereon uprightly in a direction different from a moving direction of the movable unit.

4. The force sense presentation device according to claim 3, wherein
the finger engagement portion has a curved face for contacting with the fingertip.

5. The force sense presentation device according to claim 1, further comprising:
a switch mechanism capable of being operated by the fingertip placed on the finger placement portion.

6. The force sense presentation device according to claim 1, wherein
the movable unit has a push-in member for presenting a force sense to a palm of a hand.

7. The force sense presentation device according to claim 1, wherein
the moving mechanism moves the movable unit in a longitudinal direction of the base body.

8. The force sense presentation device according to claim 1, wherein
the moving mechanism rotates the movable unit around an axial line parallel to a longitudinal direction of the base body.

9. The force sense presentation device according to claim 1, wherein
the rotary actuator is configured to rotate the feed screw to move the nut in an axial direction of the feed screw, and
the axial direction of the feed screw is in a longitudinal direction of the base body.

10. The force sense presentation device according to claim 9, wherein the plurality of rods are connected to the movable unit via the fixation portion.

11. The force sense presentation device according to claim 10, wherein
the moving mechanism further includes a guide mechanism,
the guide mechanism is fixed to an inner wall of the base body, and
the guide mechanism is configured to guide movement of the plurality of rods.

12. The force sense presentation device according to claim 9, wherein
the movable unit further includes a switch having an operation button configured to be operated by a user, and
the switch is configured to move in a direction perpendicular to the longitudinal direction of the base body.

13. The force sense presentation device according to claim 12, wherein the switch is spaced from the finger placement portion.

14. The force sense presentation device according to claim 1, wherein
the moving mechanism further includes circuitry, and
the circuitry is configured to control movement of the movable unit based on the detected rotation angle of the rotary actuator.

15. The force sense presentation device according to claim 14, wherein
the moving mechanism further includes a communication unit configured to receive reaction force data, and
in response to a user bringing up the force sense presentation device to a virtual object, the circuitry is configured to receive the reaction force data from the communication unit and control the rotary actuator to move the movable unit based on the reaction force data.

16. The force sense presentation device according to claim 1, wherein
the moving mechanism further includes circuitry, and
the circuitry is configured to control movement of the movable unit based on the detected rotation angle of the rotary actuator.

17. The force sense presentation device according to claim 16, wherein the moving mechanism further includes a communication unit configured to receive reaction force data.

18. The force sense presentation device according to claim 17, wherein in response to a user bringing up the force sense presentation device to a virtual object, the circuitry is configured to receive the reaction force data from the communication unit and control the rotary actuator to move the movable unit based on the reaction force data.

* * * * *